METHOD OF ALLOYING A MONOCRYSTAL OF A SEMICONDUCTOR

Original Filed Nov. 17, 1967

United States Patent Office 3,725,147
Patented Apr. 3, 1973

3,725,147

METHOD OF ALLOYING A MONOCRYSTAL OF A SEMICONDUCTOR

Natan Moiseevich Roizin, Leninsky prospekt 89, kv. 408; Igor Naumovich Larionav, Kalanchevskaya ulitsa 63, kv. 11; and Alvina Grigorievna Kolesova, ulitsa Pravdy 17/19, kv. 49, all of Moscow, U.S.S.R.

Original application Nov. 17, 1967, Ser. No. 684,039. Divided and this application Aug. 25, 1970, Ser. No. 66,907
Int. Cl. H01l 7/48
U.S. Cl. 148—183 6 Claims

ABSTRACT OF THE DISCLOSURE

A method of alloying the crystallographic oriented surface of a monocrystal of an electrically conductive body, making it possible to obtain an alloyed region in the form of a straight prism. In the case of a monocrystal body having a diamond-type lattic and a crystallographic surface oriented in the plane (110), an alloyed region is obtained in the form of a straight trihedral prism, whose two side faces coincide with the planes (111), and the third face coincides with the surface of the initial monocrystal, the prism axis coinciding with the direction <110>. Alloying is effected by movement of the molten zone of alloying material which is caused by passing direct current through the crystal so that the density vector of the electric current is parallel to the crystal surface to be alloyed, which is oriented in the plane (110) and coincides with the direction <110>, parallel to the surface being alloyed. This direction is an intersection line of the planes (111) of maximum atom packing which shape a "guide groove" in which the molten region of the alloying material is caused to move. When monocrystal germanium is alloyed by the aforesaid method, a strip recrystallization layer is obtained from the melt containing gallium and antimony in the shape of a straight trihedral prism oriented in the above manner.

This application is a division of application Ser. No. 684,039, now abandoned.

The present invention relates to methods of alloying monocrystals of semiconductor or metal and to semiconductor devices, and can be employed for obtaining strip monocrystalline electrodes and semiconductor device on the basis of these electrodes.

Known in the art is a method of alloying semiconductor by transferring molten metal along its surface when electric current is being passed through the semiconductor (cf., e.g. patent of Great Britain, No. 843,800).

A disadvantage of this method resides in that the region being alloyed proves to be of an irregular geometric shape and the dimensions thereof cannot be controlled.

Widely known in the present state of the art is a planar structure of semiconductor devices in which the passive area of the electrodes to which lead-outs are to be connected is greater than the area of the active region which directly controls the electric current.

The planar structure is deficient in its complexity, requiring the use of layers of various materials (dielectrics and metals).

It is an object of the present invention to provide such a method of alloying the monocrystal, which will ensure regular geometric shape and required geometric dimensions of the region being alloyed.

Another object of the present invention is to provide a semiconductor device with monocrystalline electrodes of such a shape that the dimensions of the area of the active regions of the electrodes would be less than the dimensions of the area of passive regions.

Said and other objects are attained, according to the invention, due to the fact, that the dope is introduced from a melt, the latter being transferred along the monocrystalline surface by means of electric current passing through the monocrystal, the monocrystalline surface or face being made parallel to at least one line of intersection of the planes of maximum packing of the single crystal atoms, the direction of electric current being set so that the vector of the current density on said surface or face be parallel to said line of intersection.

When alloying a monocrystal having a diamond-type lattice, the melt should be transferred along the face whose crystallographic orientation is (110), the electric current being directed so that the current density vector on the face (110) should coincide with the direction (110).

It is expedient, employing the method of the present invention, to construct semiconductor devices on the basis of monocrystal having a diamond type lattice with electrodes shaped as straight trihedral prisms, two sides of which coincide with crystallographic aplanes (111) and are at least partially disposed in the body of said monocrystal.

An advantage of the present method of alloying the monocrystalline region over other methods (employing fusion or diffusion techniques) resides in that the region being alloyed is bound by crystallographic planes, and the regularity of its geometric shape (faceting) and dimensions as well is ensured by the very crystalline structure of the monocrystal. Another advantage resides in that the distribution of the concentration of the dope in the region being alloyed is even, while on the boundaries of the region a sharp jump is observed.

The regular geometric shape of the region being alloyed when employing the method proposed herein is determined by the mechanism of solution of the monocrystal in the melt and its subsequent crystallization. The atoms of the monocrystal pass into the melt which is on the surface of the monocrystal till the solution becomes saturated. With the passage of electric current through the monocrystal, said current partly flows also through the melt in which, under the action of current, an electric transfer of the monocrystalline atoms takes place so, that on one part of the interface between the melt and the monocrystal their concentration increases and becomes more equilibrium, and on the other part of the interface it becomes less equilibrium. Therefore dissolving takes place with one part of the interface and crystallization on the other. The melt shifts towards the interface where the dissolving of the monocrystal takes place. This results in the formation of a monocrystal strip layer along the path of the shift of the melt doped with the melt atoms. As according to the invention, the current density vector is directed parallel to the line of intersection of the planes of maximum packing, and monocrystalline surface along which the melt is shifting also being oriented parallel to said line, the melt thus shifts along a prismatic surface made by the planes of maximum packing of atoms. Since the dissolving and crystallization take place in layers parallel to the planes of maximum packing, these planes bound the region being alloyed.

For the method of the present invention to be effected, it is prerequisite that the monocrystal shoud be electrically conductive. Therefore, the method proposed herein is applicable for alloying monocrystals of semiconductors and metals.

The employment of the method proposed herein for alloying monocrystals of semiconductors with a diamond-type lattice makes it possible to obtain strip electrodes with p-n junctions in the shape of straight prisms with flat edges. The electrodes may be alloyed with one dope or with several dopes of evenly distributed concentrations. In a number of cases, with the help of selective etching, strip electrodes are made so that the side faces of the prism are only partially disposed in the single monocrystal.

The advantage of such semiconductor devices with such electrodes is small area of electrically active regions directly contacting with the crystal and a large area of passive regions convenient for fixing electric lead-outs thereto or for applying mechanical forces in case of pieso-electrically susceptible transistors or diodes.

Given hereinbelow is a description of an example of obtaining a germanium structure with $p^+$-n-p junctions for a transistor, to be had in conjunction with the accompanying drawings, wherein.

Said structure is obtained as follows.

Figure 1:
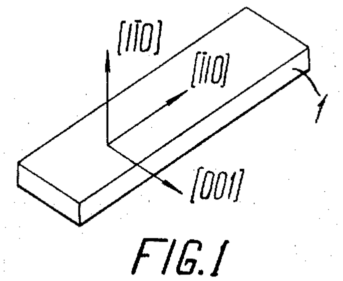
FIG. 1 shows a plate of a monocrystal and the direction of crystallographic axes.

A germanium plate of a p-type with a specific resistance of 0.5 ohm/cm., 100 mm. long, 2 mm. wide and 0.3 mm. thick is so oriented during the manufacture, that its longitudinal axis coincides with the direction (110) (FIG. 1) and its wide face with the plane (110).

For manufacturing oriented germanium plates it is expedient to employ an oriented monocrystalline band of germanium obtained by drawing from the melt through a molding chink.

The surface of a germanium plate 1 (FIG. 1) is etched in a solution comprising 43% HF, 65% HNO, 95% $CH_3COOH$ in a ratio 5:8:15 at 70° C. during 10 sec.

Figure 2:
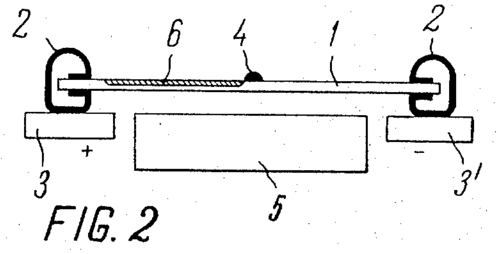
FIG. 2 shows schematically the arrangement of the plate of a monocrystal with current-carrying electrodes and a heater.

Fitted on the end face of the germanium plate 1 (FIG. 2) are contact holders 2 made of tantalum and freely slidable along the surface of current-carrying electrodes 3 and 3', which provides for a reliable electric contact with the germanium plate 1 and elimination mechanical strains caused by thermal expansion.

The electrodes 3 and 3' along which the contact holders 2 are free to slide are disposed in a working chamber (not shown in the drawing) in which the alloying process is effected.

On the germanium plate 1 disposed in the working chamber a bead 4 having a diameter of 100 microns in diameter of a gallium-antimony alloy with the concentration of antimony equal to 10 percent is applied near the positive electrode 3.

The working chamber is hermetically sealed, and a shielding medium is created therein by passing dry hydrogen. The plate 1 by means of a heater 5 is heated to 400° C. and then electric current is passed through said plate. The current intensity for the plate 1 with the dimensions specified above should be 2 amperes. The molten metal shifts along the plate from the positive electrode 3 to the negative electrode 3' leaving behind a strip recrystallized layer 6 alloyed with dopes of gallium and antimony. The molten metal moves along the surface of the plate at a velocity of about 1 mm. per min.

The strip recrystallized layer 6 (FIG. 3) is shaped as a straight trihedral prism, two side faces of which coincide with the planes (111).

Figure 3:
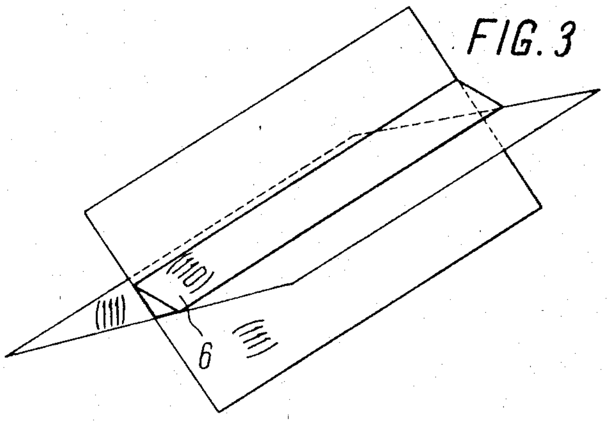
FIG. 3 shows the bound crystallographic planes of a strip recrystallized layer.

In FIG. 3 the form of the strip recrystallized layer is shown.

The width of the strip 6 for the said dimensions of the bead is about 30 microns. By varying the composition of the shielding gas medium (e.g. the humidity of hydrogen), the wetting of the surface of the plate 1 with the melt may be controlled and thus the width of the recrystallized layer 6 finely adjusted.

After the formation of the recrystallized layer over the entire length of the plate 1 the process is discontinued and the plate is removed from the working chamber.

Figure 4:
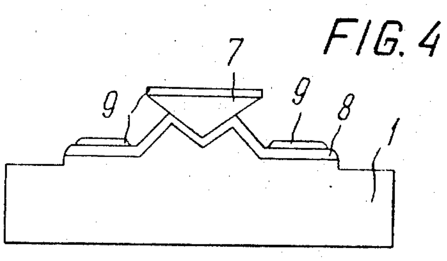
FIG. 4 shows the structure of a transistor with a prismatic electrode partially disposed in the crystal body.

Use being made of the plate 1 with the recrystallized layer 6, a transistor structure is obtained such as shown in FIG. 4.

This structure has an emitter electrode 7 in the shape of a straight trihedral prism, two side faces of which coincide with the planes of maximum packing of the monocrystal of the plate 1. The area of the passive region of the electrode is greater than that of the electrically active region. The electrode 7 partially extends above the surface of the plate 1. The transistor structure also has a base electrode 8 and a metal coating 9.

The transistor structure (FIG. 4) is obtained as follows.

The plate of a mono crystal with the recrystallized layer obtained by the method described hereinabove is etched in a selective solution. In the process of etching those layers are removed, which are parallel to the planes of maximum packing of atoms, the rate of etching of a highly alloyed recrystallized layer being several dozens of times as small as that of etching of the germanium plate.

The selective etching results in the obtaining of the base electrode 8 (FIG. 4) which is created by the diffusion of antimony from a germanium powder alloyed with antimony in the current of hydrogen at 780° C. during 2 min. Simultaneously antimony diffuses from the electrode 7 into that part of the base layer which is directly adjacent to said electrode.

The metal coating 9 is applied by spraying in a vacuum, the base and emitter metal layers being separated spatially by the emitter electrode 7 itself which serves as a mask.

The division of such a strip structure about 100 mm. long into shorter structures is determined by the dissipation power of the transistor. Due to the metallization of the base layer, the structure described hereinabove features a very small ohmic resistance of the base. For the parameter $r'v_{\text{base}}\ Ck_{\text{collector}}$ the value less than $10^{-12}$ sec. can be obtained.

The structure described hereinabove, with an extending emitter electrode has also been used for obtaining piezoelectrically susceptible transistors, since it serves as a concentrator of pressures.

What is claimed is:

1. A method of alloying the surface of an electrically conductive monocrystalline body having a diamond-type lattice and oriented in the plane (110), said method comprising: coating the surface of the body with a dope of fusible alloying material; melting said material; passing electric current through the monocrystal so that the density vector of the electric current is parallel to said surface and coincides with the crystallographic direction <110>, said electric current causing movement of a molten zone of the aloying material under the effect of electric diffusion of the material of said body through the melt, the molten zone having a shape extending along the direction <110> and moving in a guide groove formed by the intersection of the plane (111) of the maximum atom packing, whose intersection line is parallel to the density vector of said current and coincides with the direction <110>, said current causing crystallization of the material of the conductive body being alloyed and atoms of said dope from the melt thus providing for an alloyed region of the monocrystal surface and said dope along the path of the moving molten zone.

2. A method as claimed in claim 1 wherein the doped alloyed region has the shape of a straight trihedral prism, one of whose faces coincides with the monocrystal surface and the other two faces coincide with the planes (111) of maximum atom packing, the axis of said prism being parallel to the surface of the body being alloyed and to the direction <110>.

3. A method as claimed in claim 1 wherein the width of the doped alloyed region is about 30 microns.

4. A method as claimed in claim 1 wherein the dope is introduced into the crystal by mounting the crystal in a hermetic working chamber, attaching slidable electrical electrodes on the ends of the crystal, depositing a bead of the dope near the positive electrode, melting the bead and progressively advancing the same by said electric current, in the direction thereof, away from the positive electrode and towards the negative electrode whereby the alloyed region is formed in the shape of a straight trihedral prism.

5. A method as claimed in claim 4 wherein the doped alloyed region is of a conductance type which is opposite to the conductance type of the monocrystalline body, as a result of which a p-n junction in the shape of said straight trihedral prism exists at the boundary of the alloyed region and the monocrystalline body.

6. A method as claimed in claim 4 wherein the monocrystalline conductive body is germanium and the alloying material is an alloy of gallium and antimony.

References Cited

UNITED STATES PATENTS

| | | | |
|---|---|---|---|
| 3,086,857 | 4/1963 | Pfann | 148—1.6 |
| 3,480,845 | 11/1969 | Ruchardt et al. | 317—235 X |

EARL C. THOMAS, Primary Examiner

J. COOPER, Assistant Examiner